Patented Nov. 10, 1936

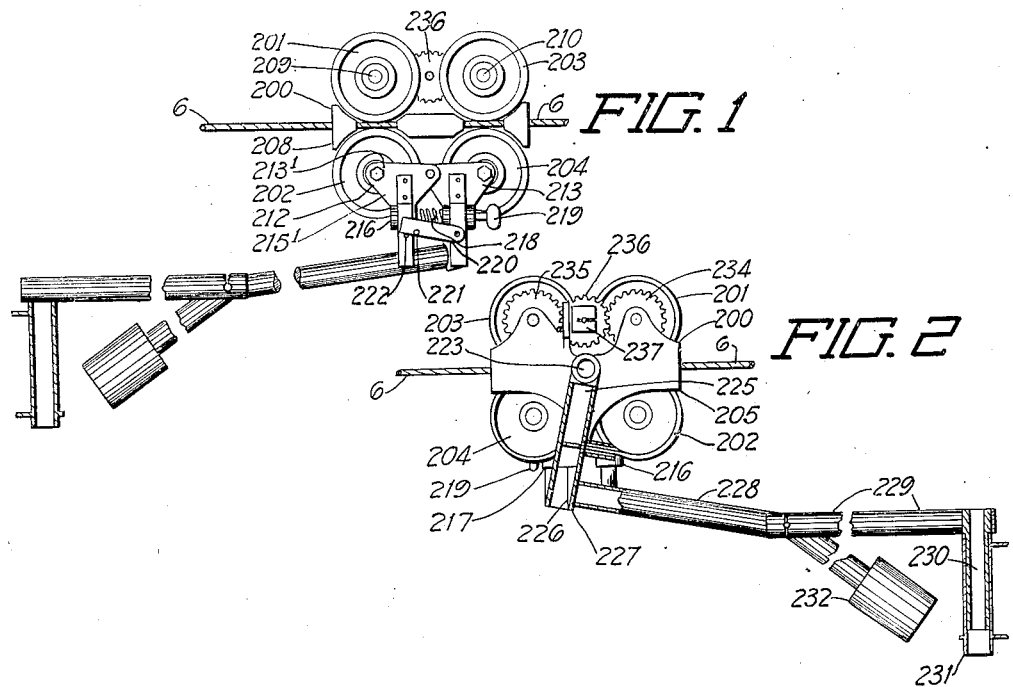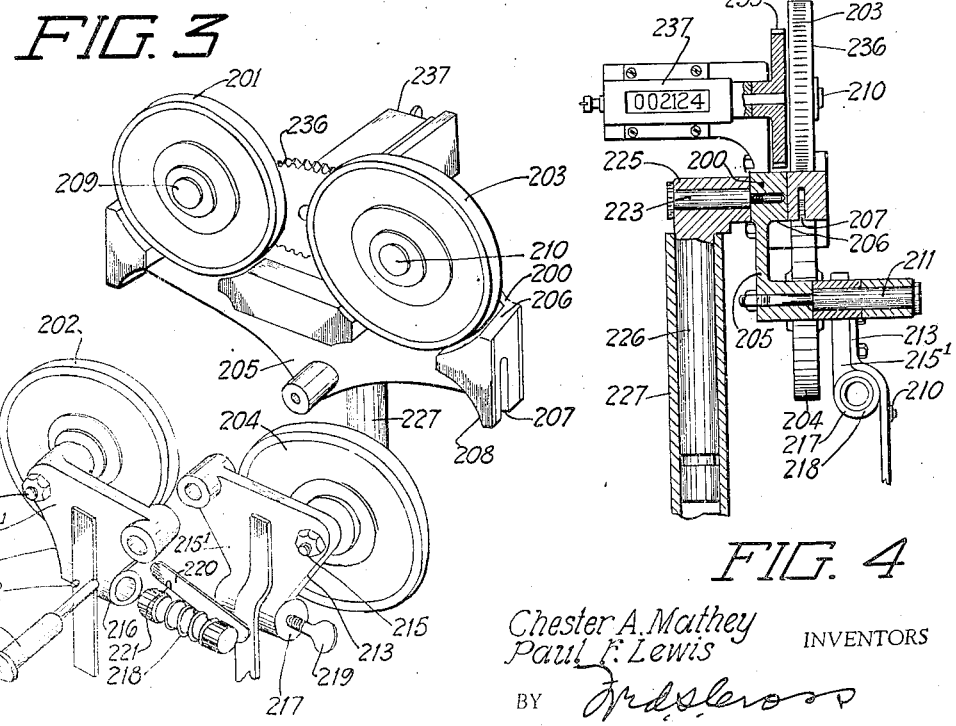

2,060,233

UNITED STATES PATENT OFFICE 2,060,233

MEASURE METER

Chester A. Mathey and Paul F. Lewis, Tulsa, Okla.; said Lewis assignor, by mesne assignments, to E. I. du Pont de Nemours and Company, a corporation of Delaware Original application January 29, 1934, Serial No. 708,839. Divided and this application November 9, 1935, Serial No. 48,964

7 Claims. (Cl. 33—134)

This invention relates to a measure meter capable of measuring the length of cable paid therethru, and more particularly for measuring the depth of wells and for like purposes.

This application is a division of our copending application, Serial No. 708,839, filed January 29, 1934, for Method and apparatus for placing explosive charges, issued November 19, 1935, as Patent 2,021,632.

The measure meter made in accordance with our invention is illustrated in the accompanying drawing in which Figure 1 is a front view in elevation of the measure meter, while Fig. 2 is a rear view in elevation of the measure meter. Fig. 3 is a disassembled perspective view of the parts of the measure meter; Fig. 4 is a central cross-sectional view through the measure meter.

The measure meter is shown as including a frame 200 carrying upper and lower pairs of wheels 201, 202, 203, and 204 adapted to operate directly upon the cable 6 as it is being paid therethru.

The frame 200 comprises a plate portion 205 having spaced laterally extending lugs 206 provided with downwardly opening slots 207 for passing the line. The ends of the lugs are cut away in arcuate curves 208 to accommodate the periphery of the wheels. Carried by the plate portion 205 directly above the spacings between the lugs are stub shafts 209 and 210 for mounting the wheels 201 and 203 with their axes in fixed relation to the frame. The wheels 202 and 204, however, are movable to and from engagement with the cable, as now to be described.

Pivotally supported on the frame 200 on a pin 211 are bell cranks 212 and 213 having arms 213' carrying stub shafts 214 and 215 for the wheels 202 and 204. The other arms 215' of the bell cranks have facing sockets 216 and 217 for mounting the ends of a coil spring 218 to swing the bell crank outwardly, thereby urging the wheels into engagement with the cable, the tension of the spring being regulated by a thumb screw 219 which is threaded into the end of the socket 217 and has its end engaging a follower of the spring 218 to vary the pressure of the wheels on the cable. The wheels 202 and 204 may be locked from engagement with the cable by a latch 220 pivoted on the bell crank 213 and having a notch 221 engageable with a pin 222 on the bell crank 212 whereby the depending arms of the bell crank may be moved toward each other against tension of the spring and latched to prevent the wheels 202 and 204 from engaging the cable to facilitate threading thereof between the pairs of wheels.

To mount the measure meter, the frame 200 has a stud 223 extending from the rear side thereof which is rockingly mounted in a horizontal bearing 225 on the upper end of a vertical post 226, the post 226 being rotatably mounted in a vertical sleeve 227 caried on the end of a lever arm 228 that is pivotally mounted for vertical oscillation on a swinging bracket 229. The latter has a pintle 230 that is rotatably mounted in a socket 231 carried on a suitable stationary support, for example one associated with the cable reels, as the cross bar designated as 19 in our above mentioned patent. It is thus obvious that the measure meter is free to rock on horizontal and vertical pivots and at varying angles relatively to a cable reel due to the mounting of the lever 228.

The weight of the measure meter is counterbalanced on the bracket 229 by a weight 232 fixed to the free end of the lever arm 228.

Fixed in driving relation with the wheels 201 and 203 are gears 234 and 235 each meshing with a common gear 236 on a counter 237 carried by the frame 200 and which registers the number of feet of cable paid from the reel.

In the foregoing description of our invention, it is apparent that many variations and modifications may be made without departing from the spirit and scope thereof. I therefore intend to be limited only in accordance with the following patent claims:

We claim:

1. A meter for measuring the length of cable paid therethrough comprising a frame and upper and lower revolving means adapted to operate directly upon the cable, said lower revolving means comprising a pair of wheels, a plate portion, means for mounting the upper revolving means on the plate portion, individual bell cranks for supporting the wheels of the lower revolving means whereby each wheel can follow the cable independently of the other, means for varying the pressure of the revolving means on the cable, means for selectively locking the lower revolving means from engagement with the cable, and means for indicating the movement of the cable through the meter.

2. A meter for measuring the length of cable paid therethrough comprising a frame, and upper and lower revolving means adapted to be operated by the cable, said lower revolving means comprising a pair of wheels, a plate portion having downwardly opening slots to receive the cable, means for mounting the upper revolving means in fixed relation to the frame, individual bell cranks for supporting the wheels of the lower revolving means whereby each wheel can follow the cable independently of the other, means for moving the lower revolving means into and out of engagement with the cable, means for varying the pressure of the revolving means on the cable, means for locking the lower revolving means from engagement with the cable, and means for indicating the movement of the cable through the revolving means.

3. A meter for measuring the length of cable paid therethrough including a frame comprising a plate portion provided with downwardly opening slots for receiving the cable, a pair of wheels, a pair of shafts on the plate portion for mounting the wheels with their axes in fixed relation to the frame, a second pair of wheels, individual bell cranks mounted on the frame and supporting the second pair of wheels whereby each wheel can follow the cable independently of the other, resilient means for swinging the bell cranks outwardly to urge the second pair of wheels into operative engagement with the cable, means for selectively locking the second pair of wheels out of engagement with the cable, and means for indicating the extent of movement of the cable when in contact with the wheels.

4. A meter for measuring the length of cable paid therethrough, said meter comprising a frame and two pairs of cable-contact wheels adapted to receive the cable therebetween, one of said pairs of wheels having their axes in fixed relation to the frame, and means for flexibly mounting the second pair of wheels in independent and individual operative relation with each other to permit said second pair of wheels to move independently toward and away from the first pair of wheels.

5. A meter for measuring the length of cable paid therethrough, said meter comprising a frame and two pairs of wheels adapted to receive the cable therebetween, one of said pairs of wheels having the axes thereof in fixed relation, and means pivoted to the frame for carrying each of the second pair of wheels in individual and independent operative relation with the cable to permit said second pair of wheels to move independently toward and away from the first pair of wheels.

6. A meter for measuring the length of cable paid therethrough, said meter comprising a frame, two series of revolving cable contact members oppositely disposed with respect to the cable, one of said series of revolving cable contact members having fixed axes, and means for flexibly mounting the second of said series of cable contact members independently and individually of each other and of the first of said series of cable contact members to permit said second pair of revolving cable contact members to move independently toward and away from the first pair of revolving cable contact members having fixed axes.

7. A meter for measuring the length of cable paid therethrough, said meter comprising a frame, two pairs of opposed revolving means carried by said frame to receive the cable therebetween for direct operation thereon, one of said pairs of revolving means having fixed axes on the frame, and means for independently and individually connecting the second pair of revolving means to each other and to the frame to provide separate and independent travel of the second pair of revolving means with respect to each other toward and from the normal line of travel of the received cable through the meter between the opposed revolving means.

CHESTER A. MATHEY.
PAUL F. LEWIS.